United States Patent
Ohno

(10) Patent No.: US 9,979,688 B2
(45) Date of Patent: May 22, 2018

(54) NOTIFICATION CONTROL DEVICE, NOTIFICATION CONTROL METHOD, AND NOTIFICATION CONTROL PROGRAM

(71) Applicant: NEC Platforms, Ltd., Kawasaki-shi, Kanagawa (JP)

(72) Inventor: Tomohiro Ohno, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days. days.

(21) Appl. No.: 15/566,864

(22) PCT Filed: Jul. 21, 2016

(86) PCT No.: PCT/JP2016/071418
§ 371 (c)(1),
(2) Date: Oct. 16, 2017

(87) PCT Pub. No.: WO2017/038287
PCT Pub. Date: Mar. 9, 2017

(65) Prior Publication Data
US 2018/0091464 A1   Mar. 29, 2018

(30) Foreign Application Priority Data

Sep. 2, 2015   (JP) ................................. 2015-172478

(51) Int. Cl.
*G06K 9/00* (2006.01)
*H04L 12/58* (2006.01)

(52) U.S. Cl.
CPC .......... *H04L 51/24* (2013.01); *G06K 9/00335* (2013.01); *G06K 9/00362* (2013.01); *H04L 51/04* (2013.01)

(58) Field of Classification Search
USPC ......................................................... 382/103
See application file for complete search history.

(56) References Cited

U.S. PATENT DOCUMENTS

2009/0135007 A1   5/2009   Donovan et al.
2009/0303176 A1*  12/2009  Chen ....................... G06F 3/017
                                                                345/156
(Continued)

FOREIGN PATENT DOCUMENTS

JP   2006-146911 A   6/2006
JP   2008-052422 A   3/2008
(Continued)

OTHER PUBLICATIONS

International Search Report for PCT/JP2016/071418 dated Oct. 18, 2016 [PCT/ISA/210].
(Continued)

*Primary Examiner* — Gregory F Cunningham
(74) *Attorney, Agent, or Firm* — Sughrue Mion, PLLC

(57) ABSTRACT

Control pertaining to a notification and so on is performed without a user needing to carry out a troublesome operation prior to a notification. A notification control device includes an image analyzing unit that makes a first determination of determining whether a user is present in a predetermined location by analyzing image data of an image captured by an imaging unit, and a notification control unit that gives a predetermined notification to the user in a case in which it is determined in the first determination that the user is present in the predetermined location and refrains from giving the predetermined notification to the user in a case in which it is determined that the user is not present in the predetermined location.

8 Claims, 7 Drawing Sheets

(56) References Cited

U.S. PATENT DOCUMENTS

| | | | | |
|---|---|---|---|---|
| 2011/0107215 A1* | 5/2011 | Klappert | ................ | G06F 3/167 |
| | | | | 715/716 |
| 2014/0354538 A1* | 12/2014 | Lee | ........................ | G06F 3/013 |
| | | | | 345/156 |
| 2016/0127287 A1 | 5/2016 | Oh et al. | | |
| 2017/0323068 A1* | 11/2017 | Dintenfass | .......... | G06F 19/3406 |
| 2017/0337602 A1* | 11/2017 | Davis | ................ | G06Q 30/0607 |

FOREIGN PATENT DOCUMENTS

| | | | | |
|---|---|---|---|---|
| JP | 2015-061122 A | 3/2015 | | |
| JP | 2015061122 A * | 3/2015 | ............ | H04M 1/100 |
| WO | 2014/123270 A1 | 8/2014 | | |
| WO | WO 2014/123270 A1 * | 8/2014 | ............... | G06K 9/46 |

OTHER PUBLICATIONS

Written Opinion for PCT/JP2016/071418 dated Oct. 18, 2016 [PCT/ISA/237].
Japanese Office Action for 2015-172478 dated Oct. 25, 2016.
Communication dated Dec. 6, 2017 from the Canadian Intellectual Property Office in counterpart application No. 2983094.
Communication dated Mar. 19, 2018, from European Patent Office in counterpart application No. 16841319.3.

* cited by examiner

NOTIFICATION CONTROL DEVICE, NOTIFICATION CONTROL METHOD, AND NOTIFICATION CONTROL PROGRAM

CROSS REFERENCE TO RELATED APPLICATIONS

This application is a National Stage of International Application No. PCT/JP2016/071418 filed Jul. 21, 2016, claiming priority based on Japanese Patent Application No. 2015-172478 filed Sep. 2, 2015, the contents of all of which are incorporated herein by reference in their entirety.

TECHNICAL FIELD

The present invention relates to a notification control device, a notification control method, and a notification control program for performing control pertaining to notifications.

BACKGROUND ART

Information is widely exchanged between users via a computer network such as the Internet. Electronic mail and instant messages, for example, are used as a means for exchanging information.

In this respect, software called an email client (a mailer) is typically used to create, transmit, or receive an electronic mail or to save or manage a received mail. In addition, software called an instant messenger is typically used to create, transmit, or receive an instant message or to save or manage a received instant message.

Such an email client or an instant messenger is used upon it being installed in an electronic device, such as a personal computer or a mobile terminal.

An email client or an instant messenger typically displays, on a screen of an electronic device, a notification such as "a mail has been received" or "an instant message has been received" through a technique such as a pop-up when an electronic mail or an instant message is received.

Then, upon referring to such a display, a user can recognize that an electronic mail, an instant message, or the like addressed to the user has been received.

Patent Literature 1 describes an example of a technique for giving such a notification of reception. In the technique described in Patent Literature 1, notification processes for an email and an instant message service are integrated. Then, according to the technique described in Patent Literature 1, when an email or an instant message is received, a notification pertaining to either of the email and the instant message is given through a common interface provided by the integrated notification process. Thus, the user can find that an email or an instant message service has been received only by logging in to the integrated notification process and by referring to the common interface.

CITATION LIST

Patent Literature

Patent Literature 1: Japanese Unexamined Patent Application Publication No. 2006-146911

SUMMARY OF INVENTION

Technical Problem

As described above, most email clients and instant messengers are provided with a reception notification function of notifying a user that an email or an instant message has been received.

However, receiving a notification through such a reception notification function can cause an inconvenience in some situations.

For example, there is a case in which a user gives a presentation or holds a conference with a projector or a large-sized liquid-crystal display being connected to an image output unit of an electronic device used by the user. In such a situation, there is not direct relation between receiving an email or an instant message addressed to the user of the electronic device and the content of the presentation, the conference, or the like. In other words, reception of a notification of an email or an instant message addressed to the user of the electronic device during the presentation, the conference, or the like disturbs the presentation or the conference in such a situation. Therefore, a notification through the reception notification function needs to be prevented from being displayed on the screen.

To achieve this, the setting pertaining to the reception notification function of the email client or the instant messenger may be changed prior to the presentation or the conference so that the notification through the reception notification function will not be displayed on the screen even if an email or an instant message is received.

However, changing the setting in advance is troublesome for the user. In addition, the setting needs to be restored to the original state after a conference or the like finishes.

Furthermore, if the user forgets to change the setting in advance, a notification through the reception notification function is displayed on the screen during a presentation or a conference.

Accordingly, the present invention is directed to providing a notification control device, a notification control method, and a notification control program that can perform control pertaining to a notification and so on without a user needing to carry out a troublesome operation prior to a notification.

Solution to Problem

According to a first aspect of the present invention, provided is a notification control device that includes an image analyzing unit that makes a first determination of determining whether a user is present in a predetermined location by analyzing image data of an image captured by an imaging unit, and a notification control unit that gives a predetermined notification to the user in a case in which it is determined in the first determination that the user is present in the predetermined location and refrains from giving the predetermined notification to the user in a case in which it is determined that the user is not present in the predetermined location.

According to a second aspect of the present invention, provided is a notification control method that includes making a first determination of determining whether a user is present in a predetermined location by analyzing image data of an image captured by an imaging unit, and giving a predetermined notification to the user in a case in which it is determined in the first determination that the user is present in the predetermined location and refraining from giving the predetermined notification to the user in a case in which it is determined that the user is not present in the predetermined location.

According to a third aspect of the present invention, provided is a notification control program that causes a computer to function as a notification control device that includes an image analyzing unit that makes a first determination of determining whether a user is present in a predetermined location by analyzing image data of an image captured by an imaging unit, and a notification control unit that gives a predetermined notification to the user in a case in which it is determined in the first determination that the user is present in the predetermined location and refrains from giving the predetermined notification to the user in a case in which it is determined that the user is not present in the predetermined location.

Advantageous Effects of Invention

According to the present invention, control pertaining to a notification and so on can be performed without a user needing to carry out a troublesome operation prior to a notification.

DESCRIPTION OF EMBODIMENTS

Now, embodiments of the present invention will be described in detail with reference to the drawings.

Figure 1:
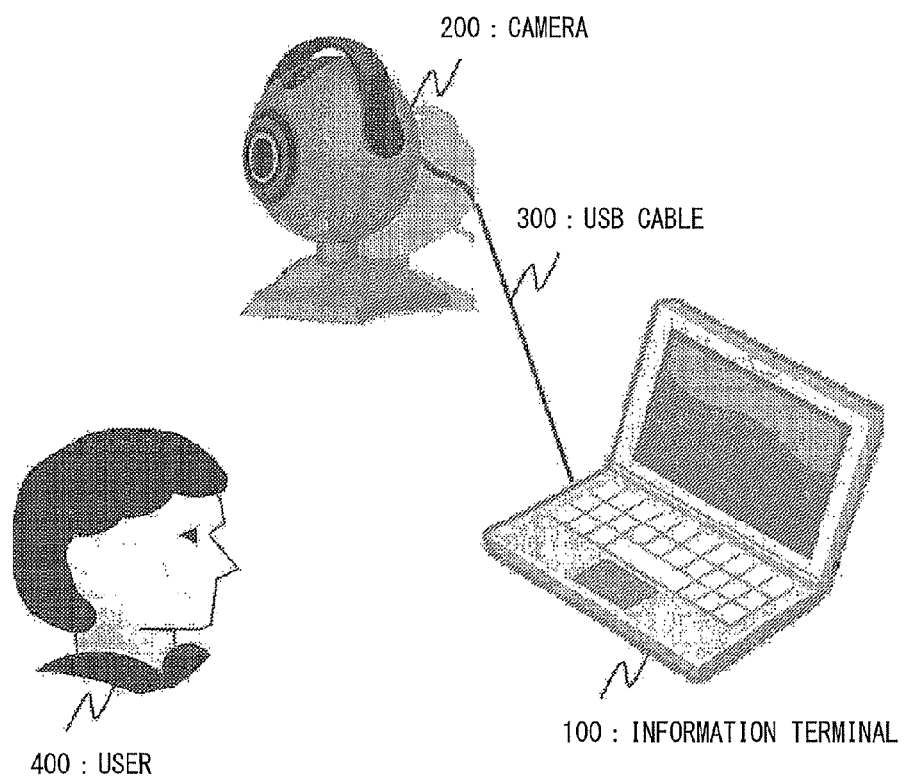
FIG. 1 illustrates a basic configuration of an embodiment as a whole according to the present invention.

First, FIG. 1 illustrates an overall diagram of the present embodiment. As illustrated in FIG. 1, the present embodiment includes an information terminal 100 and a camera 200. In addition, as illustrated in FIG. 1, a user 400 who uses the information terminal 100 is present.

The information terminal 100 is, for example, a terminal, such as a personal computer.

The camera 200 is a camera, such as a Web camera, and is installed at a location from which an image of the vicinity of the information terminal 100 can be captured. In addition, the camera 200 can capture an image of the user 400 when the user 400 is in the vicinity of the information terminal 100. The "vicinity" as used herein refers, for example, to a location where the user 400 can refer to a display screen provided in the information terminal 100 and, for example, is a location within several tens of centimeters in front of the display screen provided in the information terminal 100.

The information terminal 100 and the camera 200 are connected to each other via a USB (Universal Serial Bus) cable 300 compliant with the USB standard. Thus, an image captured by the camera 200 is transmitted to the information terminal 100.

In the present embodiment, a function of an instant messenger installed in the information terminal 100 is controlled with the use of image data captured by the camera 200 and an image recognition function of the information terminal 100.

In more concrete terms, an image of the vicinity of the information terminal 100 captured by the camera 200 is analyzed by the information terminal 100 through the image recognition function.

For example, whether the user is present in the vicinity of the information terminal 100 is determined through an analysis of the image recognition function.

Then, on the basis of the determination result, a notification method or the like of the instant messenger is changed between in a case in which the user is in the vicinity of the information terminal 100 and in a case in which the user is not in the vicinity of the information terminal 100.

For example, in a case in which the user is in the vicinity of the information terminal 100 when an instant message is received, a pop-up indicating that an instant message has been received, for example, is displayed on a display unit of the information terminal 100.

Meanwhile, in a case in which the user is not in the vicinity of the information terminal 100 when an instant message is received, the notification method is switched, and such a pop-up is not displayed even if an instant message is received.

In addition, in the present embodiment, whether the user has made a predetermined gesture is determined through an analysis of the image recognition function.

Then, on the basis of the determination result, a notification method or the like of the instant messenger is changed.

For example, even in a case in which the user is in the vicinity of the information terminal 100 when an instant message is received, a pop-up is not displayed when an instant message is received if a user makes a predetermined gesture. In this case, if the user further makes another predetermined gesture, a pop-up indicating that an instant message has been received is displayed thereafter on the display unit of the information terminal 100 when an instant message is received.

In this manner, in the present embodiment, an advantageous effect is provided in which, through a process corresponding to the result of analysis of the image recognition, control pertaining to a notification and so on can be performed without the user needing to carry out a troublesome operation prior to a notification.

Although the camera 200 is externally connected to the information terminal 100 via the USB cable 300 in the configuration illustrated in FIG. 1, the camera 200 may be embedded in the information terminal 100. In this case, using a Web camera embedded in advance in a notebook-type information terminal 100 or a tablet-type information terminal 100 as the camera 200 renders it unnecessary to prepare a new camera for the present embodiment, which is thus preferable. In particular, the use of a front-facing camera installed on the display unit side of a notebook-type information terminal 100 or a tablet-type information terminal 100 facilitates image-capturing of the user 400 in front of the notebook-type information terminal 100 or the tablet-type information terminal 100, which is thus preferable.

Figure 2:
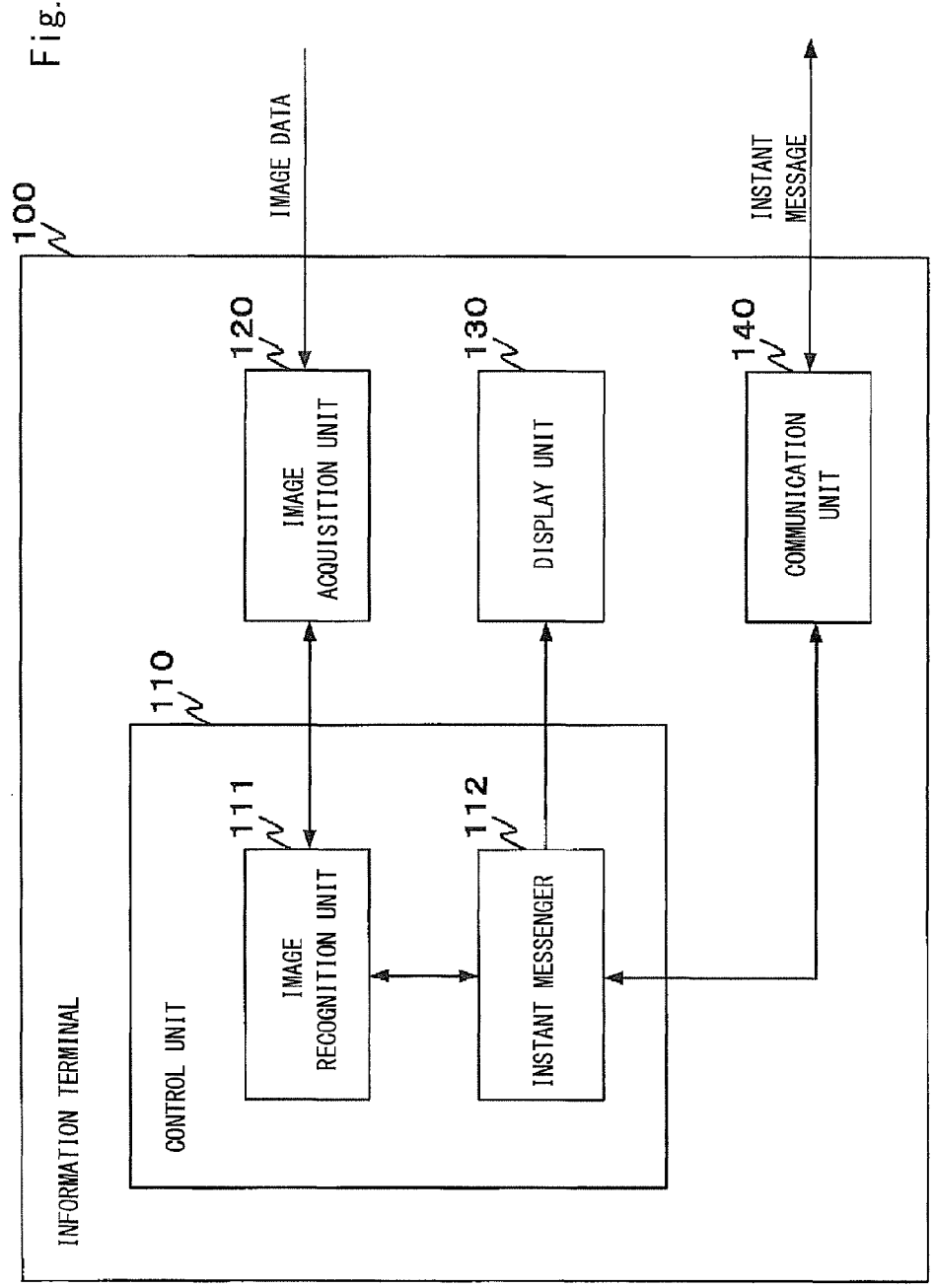
FIG. 2 is a block diagram illustrating a basic configuration of an information terminal according to an embodiment of the present invention.

With reference to FIG. 2, functional blocks implemented by the information terminal 100 described above will now be described.

With reference to FIG. 2, the information terminal information terminal 100 includes a control unit 110, an image acquisition unit 120, a display unit 130, and a communication unit 140. In addition, the control unit 110 includes an image recognition unit 111 and an instant messenger 112.

The control unit 110 is a portion that controls the information terminal 100 as a whole. The control unit 110 can be implemented by an arithmetic operation processing device such as a CPU (Central Processing Unit), a main storage device such as a RAM (Random Access Memory), and an auxiliary storage device such as an HDD (Hard Disk Drive) or an SSD (Solid State Drive). Various pieces of software, such as an operating system, software for implementing the instant messenger, and software for implementing an image recognition process, are stored in the auxiliary storage device.

The arithmetic operation processing device loads these pieces of software stored in the auxiliary storage device and carries out an arithmetic operation process based on these pieces of software while using the main storage device. The control unit 110 controls the hardware included in the information terminal 100 on the basis of the result of such an arithmetic operation process. In other words, the information terminal 100 can be implemented through the cooperation of the hardware and the software. In addition, the control unit 110 implements the image recognition unit 111 and the instant messenger 112 on the basis of the result of such an arithmetic operation process.

The image recognition unit 111 is a portion that carries out an image recognition process. Specifically, the image recognition unit 111 carries out an image recognition process on the image data of the vicinity of the information terminal 100 acquired by the image acquisition unit 120 to thus determine whether the user 400 is present in the vicinity of the information terminal 100. In addition, the image recognition unit 111 carries out an image recognition process on the image data of the vicinity of the information terminal 100 acquired by the image acquisition unit 120 to thus determine whether the user 400 has made a predetermined gesture.

These determinations are made in response to a request from the instant messenger 112. Then, the instant messenger 112 is notified of the determination result.

The instant messenger 112 is an instant messenger and has a function of giving a notification of reception through a pop-up display or the like when an instant message is received, in a manner similar to that of an ordinary instant messenger. However, the instant messenger 112 changes the method of notifying of the reception in accordance with the determination result by the instant messenger 112, instead of displaying a pop-up every time an instant message is received. The content of a specific process of the instant messenger 112 will be described later with reference to some flowcharts.

The image acquisition unit 120 is an interface to be connected to the camera 200 via the USB cable 300 and is implemented by a terminal compliant with the USB standard in the present embodiment. The image acquisition unit 120 acquires, from the camera 200, the image data of an image of the vicinity of the information terminal 100 captured by the camera 200. Then, the image acquisition unit 120 transmits the acquired image data to the image recognition unit 111. Although the camera 200 may capture an image of the vicinity of the information terminal 100 and the image acquisition unit 120 may acquire image data from the camera 200 and transmit the image data to the image recognition unit 111 upon an instruction from the control unit 110, the stated operations may instead be carried out constantly. In FIG. 2, the camera 200 and the USB cable 300 illustrated in FIG. 1 are omitted.

The display unit 130 is a display unit for displaying information output from the control unit 110 and is implemented, for example, by a liquid-crystal display. In the present embodiment, although only the connection between the instant messenger 112 and the display unit 130 is illustrated for simplifying the description, information output from other software operated by the control unit 110 is also displayed on the display unit 130.

The communication unit 140 is a portion through which the control unit 110 transmits and receives information to and from another information terminal.

The communication unit 140 is connected, for example, to a LAN (Local Area Network), the Internet, or a network such as a mobile phone network and implements communication with another information terminal via these networks. In the present embodiment, an instant message that the instant messenger 112 transmits and receives to and from another information terminal is also transmitted and received via the communication unit 140. Although only an instant message transmitted and received via the communication unit 140 is illustrated for simplifying the description, information transmitted and received by software other than the instant messenger 112 is also transmitted and received via the communication unit 140.

Thus far, each of the functional blocks included in the information terminal 100 has been described. However, these described functional blocks are only the portions that are particularly relevant to the present embodiment. The information terminal 100 may further include, aside from these functional blocks, unillustrated functional blocks, such as an operation unit for accepting an operation of the user 400 and a power source unit for controlling the power source supplied to the information terminal 100, for example.

Figure 3:
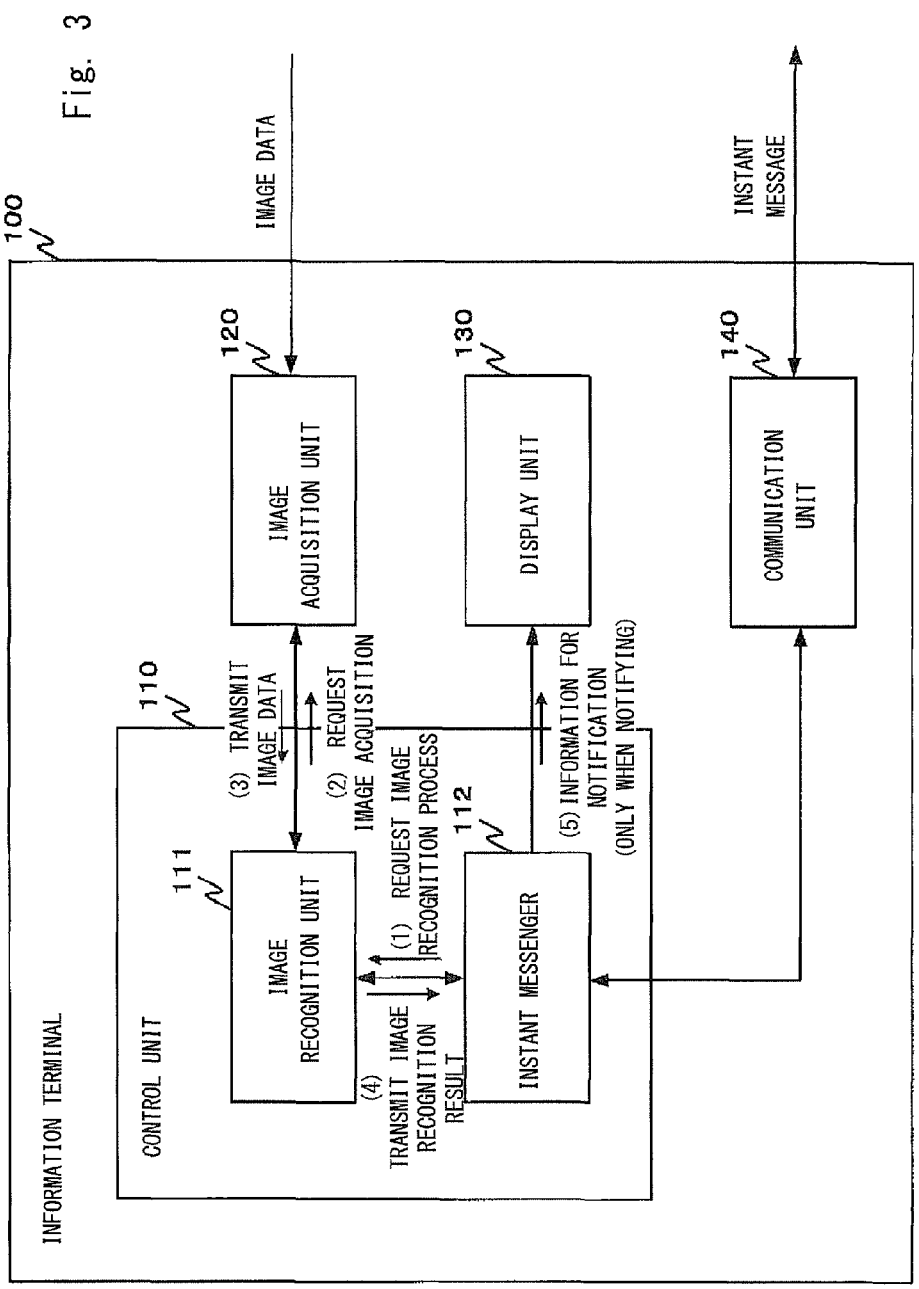
FIG. 3 illustrates data transmitted and received within an information terminal according to an embodiment of the present invention.

With reference to FIG. 3, information transmitted and received between the functional blocks inside the information terminal 100 will now be described. The numbers in the parentheses in the following description correspond to the numbers in the parentheses in FIG. 3.

(1) First, upon receiving an instant message or periodically regardless of whether an instant message has been received, the instant messenger 112 requests the image recognition unit 111 to execute an image recognition process.

(2) The image recognition unit 111 requests camera 200 to acquire an image via the image acquisition unit 120.

(3) In response to the image acquisition request, the image acquisition unit 120 acquires the image data. Specifically, the image acquisition unit 120 acquires, from the camera 200, the image data of the vicinity of the information terminal 100 captured by the camera 200. Then, the image acquisition unit 120 transmits the acquired image data to the image recognition unit 111.

(4) The image recognition unit 111 carries out an image recognition process on the image data received from the image acquisition unit 120, determines whether the user 400 is present in the vicinity of the information terminal 100 and determines whether the user 400 in the vicinity of the information terminal 100 has made a predetermined gesture. The determination result is transmitted to the instant messenger 112.

(5) The instant messenger 112 determines whether to notify of the reception of an instant message on the basis of the determination result received from the image recognition unit 111. Then, if the reception of an instant message is to be notified, information for the notification is transmitted to the display unit 130 to cause the display unit 130 to display a pop-up indicating that an instant message has been received. Meanwhile, if the reception of an instant message is not to be notified, the instant messenger 112 does not transmit information in particular.

Now, a process of determining whether a notification of reception is displayed when the instant messenger 112 has received an instant message will be described with reference to FIG. 4.

First, the instant messenger 112 receives, via the communication unit 140, an instant message from an information terminal used by another user 400 (step S11).

Then, the instant messenger 112 requests the image recognition unit 111 to analyze the image data through image recognition to determine whether the user 400 is present in the vicinity of the information terminal 100 (step S13). Upon receiving such a request, the image recognition unit 111 carries out an image recognition process on the image data of the vicinity of the information terminal 100 acquired via the image acquisition unit 120 to determine whether the user 400 is present in the vicinity of the information terminal 100.

Next, the instant messenger 112 receives, as the result of the image recognition, information indicating whether the user 400 is present in the vicinity of the information terminal 100 from the image recognition unit 111 (step S15).

Here, if the information received in step S15 is information indicating that "the user 400 is present in the vicinity of the information terminal 100" (Yes in step S17), the instant messenger 112 transmits, to the display unit 130, information for notifying that an instant message has been received (step S19). Then, the display unit 130 displays the received information, and thus the user 400 using the instant messenger 112 is notified that an instant message has been received through a technique such as a pop-up.

Meanwhile, if the information received in step S15 is information indicating that "the user 400 is not present in the vicinity of the information terminal 100" (No in step S17), the instant messenger 112 refrains from carrying out a process for displaying a pop-up or the like for notifying that an instant message has been received (step S21). Therefore, the display unit 130 refrains from displaying a pop-up or the like. Thus, an unintended pop-up display can be prevented when, for example, the user 400 is using the information terminal 100 that is connected to an external display device in a presentation, a conference, or the like or when the user 400 is in a location where the user 400 cannot refer to the display unit 130. If the information received in step S15 is information indicating that "the user 400 is not present in the vicinity of the information terminal 100" (No in step S17), a pop-up is not displayed, but the state of the icon associated with the instant messenger 112 is preferably changed and displayed so that the user 400 can notice at a later time that an instant message has been received. For example, the color or the shape of the icon displayed on the display unit 130 is preferably changed to the color or the shape that indicates that an instant message has been received.

Thus far, the process of the instant messenger 112 carried out when an instant message is received has been described with reference to the flowchart illustrated in FIG. 4. Now, with reference to the flowchart illustrated in FIG. 5, how the instant messenger 112 switches the setting of an instant message reception notification function on the basis of a gesture made by the user 400 will be described.

Figure 5:
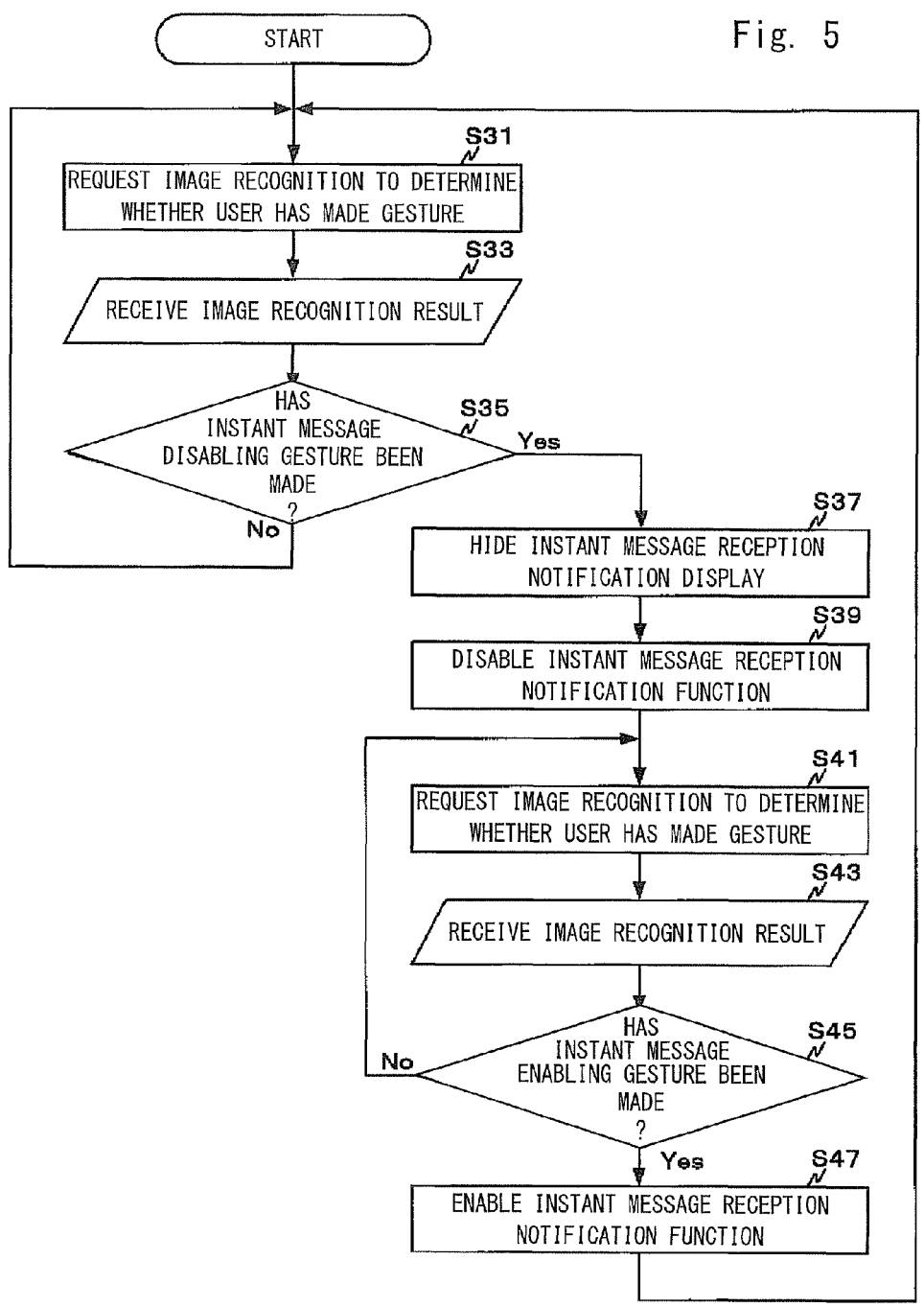
FIG. 5 is a flowchart illustrating an operation pertaining to a user's gesture according to an embodiment of the present invention.

With reference to FIG. 5, the instant messenger 112 requests the image recognition unit 111 to analyze the image data through image recognition to determine whether the user 400 has made a gesture (step S31). Upon receiving such a request, the image recognition unit 111 carries out an image recognition process on the image data of the vicinity of the information terminal 100 acquired via the image acquisition unit 120 to determine whether the user 400 has made a gesture.

Next, the instant messenger 112 receives, as the result of the image recognition, information indicating whether the user 400 in the vicinity of the information terminal 100 has made a gesture from the image recognition unit 111 (step S33).

In the present embodiment, two gestures made by the user 400 are used. First, a first gesture is an instant message reception notification function disabling gesture (hereinafter, referred to as a "disabling gesture" as appropriate). For example, when the user 400 crosses his/her fingers to make a cross sign toward the camera 200, it is determined that the instant message reception notification function disabling gesture has been made.

Another gesture, that is, a second gesture is an instant message reception notification function enabling gesture (hereinafter, referred to as an "enabling gesture" as appropriate). For example, when the user 400 brings the tip of a thumb and the tip of an index finger into contact with each other to form a circle sign toward the camera 200, it is determined that the instant message reception notification function enabling gesture has been made. These gestures to be made by the user 400 are merely examples. Thus, which gesture made by the user 400 leads to the determination that the disabling gesture has been made or which gesture made by the user 400 leads to the determination that the enabling gesture has been made can be determined as desired in advance.

If the result of the analysis by the image recognition unit 111 indicates that the disabling gesture has not been made (this includes a case in which the user 400 is not in the vicinity of the information terminal 100 or a case in which the user 400 has made the enabling gesture) (No in step S35), the instant messenger 112 returns to step S31 to make a determination again. In other words, the instant messenger 112 repeats the processes in step S31, step S33, and step S35 at a prescribed interval.

Meanwhile, if the result of the analysis by the image recognition unit 111 indicates that the disabling gesture has been made (Yes in step S35), the image recognition unit 111 causes the display unit 130, if a notification indicating that an instant message has been received is being displayed on the display unit 130, to immediately hide such a display (step S37). Then, the display unit 130 is kept from displaying a notification indicating that an instant message has been received even if an instant message is received thereafter. Thus, the instant messenger 112 disables the instant message reception notification function of the instant messenger 112 (step S39).

With these operations, even in a case in which a notification indicating that an instant message has been received is given when it is not intended by the user 400, the display of the instant message reception notification can be hidden only through a simple operation in which the user 400 makes the disabling gesture.

Next, the instant messenger 112 requests the image recognition unit 111 to analyze the image data through image recognition to determine whether the user 400 has made a gesture (step S41). Upon receiving such a request, the image recognition unit 111 carries out an image recognition process on the image data of the vicinity of the information terminal 100 acquired via the image acquisition unit 120 to determine whether the user 400 has made a gesture.

Then, the instant messenger 112 receives, as the result of the image recognition, information indicating whether the user 400 in the vicinity of the information terminal 100 has made a gesture from the image recognition unit 111 (step S43).

If the result of the analysis by the image recognition unit 111 indicates that the enabling gesture has not been made (this includes a case in which the user 400 is not in the vicinity of the information terminal 100 or a case in which the user 400 has made the instant message disabling gesture) (No in step S45), the instant messenger 112 returns to step S41 to make a determination again. In other words, the instant messenger 112 repeats the processes in step S41, step S43, and step S45 at a prescribed interval.

Meanwhile, if the result of the analysis by the image recognition unit 111 indicates that the enabling gesture has been made (Yes in step S45), the image recognition unit 111 causes the display unit 130 to display a notification indicating that an instant message has been received when an instant message is received thereafter. Thus, the instant messenger 112 enables the instant message reception notification function of the instant messenger 112, which has been disabled in step S39 (step S47).

With these operations, even when the user 400 has once disabled the reception notification function, the instant message reception notification can be displayed thereafter only through a simple operation in which the user 400 makes the enabling gesture.

Figure 6:
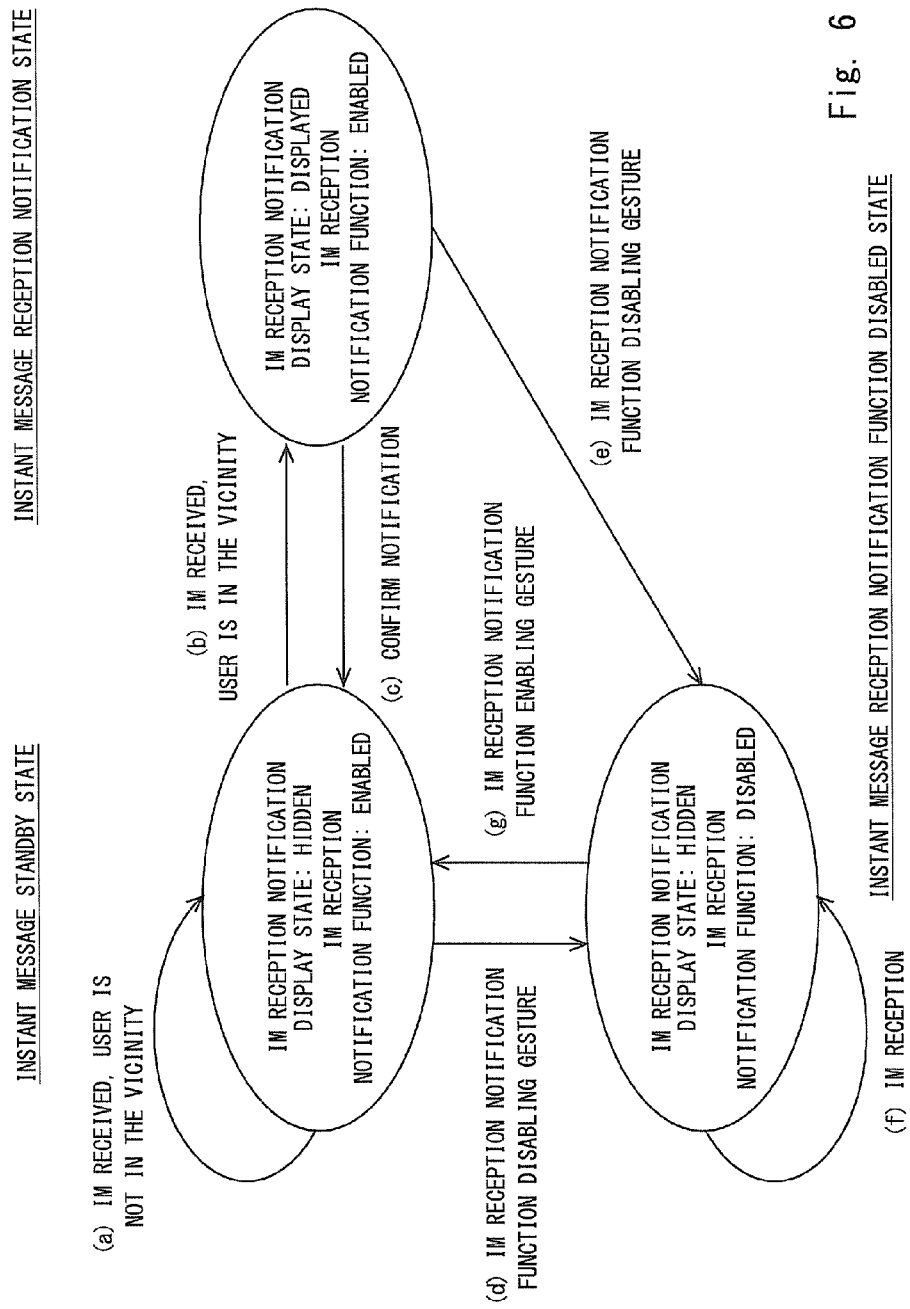
FIG. 6 is a state transition diagram of an instant messenger according to an embodiment of the present invention.

Thus far, the processes carried out by the instant messenger 112 have been described with reference to FIG. 4 and FIG. 5. Now, the display status of the instant message reception notification screen of the instant messenger 112 in the above-described processes and how the state pertaining to enabling or disabling of the instant message reception notification function transitions will be described with reference to the state transition diagram illustrated in FIG. 6. In FIG. 6, the instant message is represented by "IM" for simplifying the drawing.

As illustrated in FIG. 6, the instant messenger 112 transitions into one of the three roughly divided states: an "instant message standby state" illustrated in the upper left in FIG. 6, an "instant message reception notifying state" illustrated in the upper right in FIG. 6, and an "instant message reception notification function disabled state" illustrated in the lower left in FIG. 6.

Furthermore, the instant messenger 112 has an "instant message reception notification display state," which is a current state in each of the aforementioned three states. This indicates whether the instant message reception notification is currently displayed on the display unit 130. In this respect, if the instant message reception notification is being displayed, the state is "instant message reception notification display state: displayed." Meanwhile, if the instant message reception notification is not being displayed, the state is "instant message reception notification display state: hidden."

Furthermore, the instant messenger 112 has an "instant message reception notification function" that indicates the state of the setting of the instant message notification function in each of the aforementioned three states. This indicates the state of the setting regarding whether the instant message reception notification is to be displayed on the display unit 130 when an instant message is received. In this respect, if an instant message reception notification is set to be displayed on the display unit 130 when an instant message is received, the state is "instant message reception notification function: enabled." Meanwhile, if the instant message reception notification is set not to be displayed, the state is "instant message reception notification function: disabled."

Figure 4:
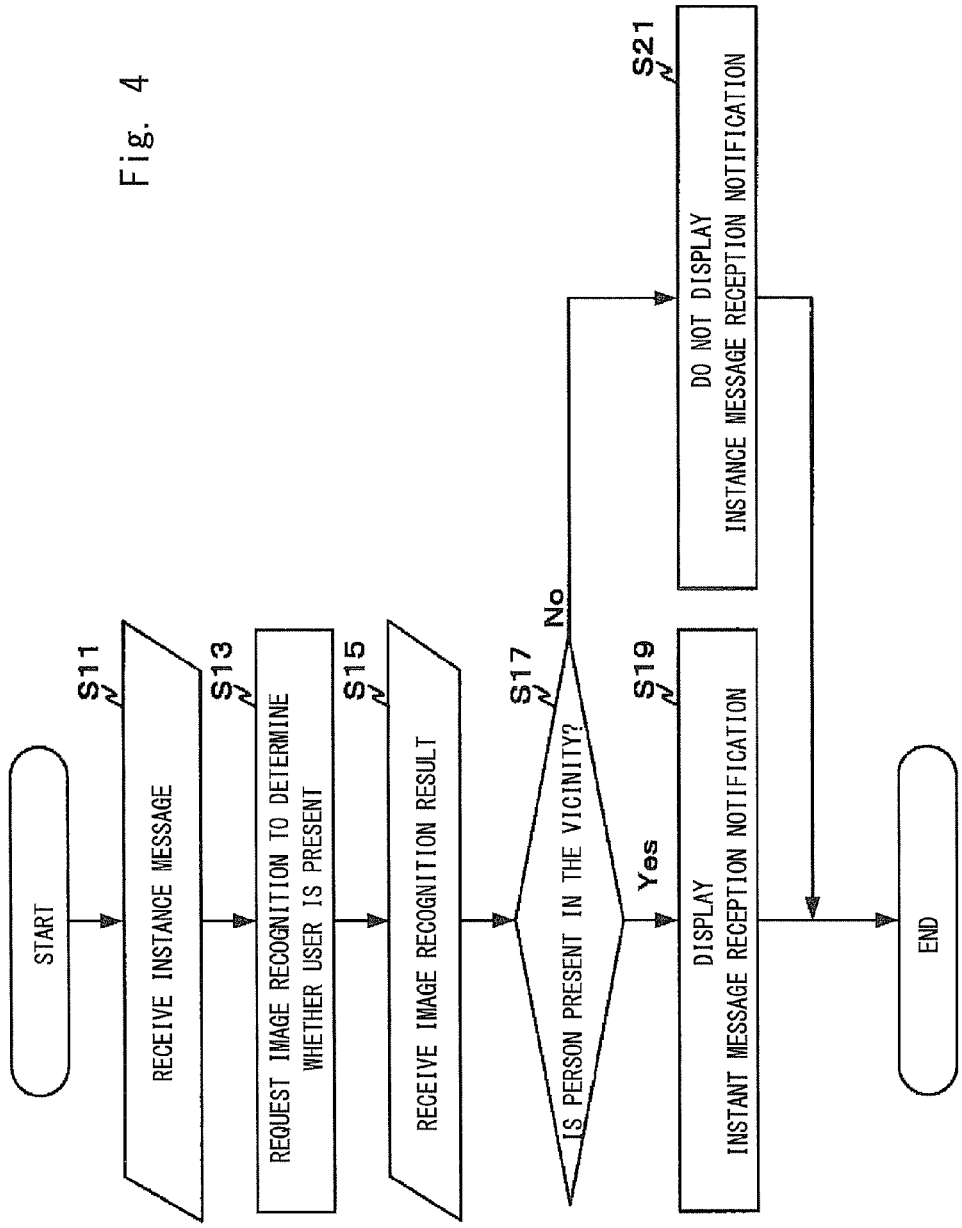
FIG. 4 is a flowchart illustrating an operation carried out when an instant message is received according to an embodiment of the present invention.

If the instant messenger 112 is currently in the "instant message standby state," the state is "instant message reception notification display state: hidden" and "instant message reception notification function: enabled." If an instant message is received in this case, the instant messenger 112 determines whether the user 400 is in the vicinity of the information terminal 100 (corresponding to step S11 to step S17 of FIG. 4).

Then, if the user 400 is not in the vicinity, the "instant message standby state" is retained. In other words, there is no transition in the state, and the reception of an instant message is not notified (corresponding to No in step S17 and step S21 of FIG. 4 and (a) in FIG. 6).

Meanwhile, if the user 400 is in the vicinity, the sate transitions into the "instant message reception notifying state." Here, in the "instant message reception notifying state," the state is "instant message reception notification display state: displayed" and the "instant message reception notification function: enabled." In other words, a notification of reception of an instant message is displayed (corresponding to Yes in step S17 and step S19 of FIG. 4 and (b) in FIG. 6). Thereafter, upon confirmation that the reception of an instant message has been notified, the state transitions back into the "instant message standby state," and the state becomes "instant message reception notification display state: hidden" (corresponding to (c) in FIG. 6).

In addition, in a case in which the disabling gesture is made when the state is in the "instant message standby state" or the "instant message reception notifying state," the state transitions into the "instant message reception notification function disabled state." Here, in the state of the "instant message reception notification function disabled state", the state is "instant message reception notification display state: hidden" and "instant message reception notification function: disabled." In other words, thereafter, the instant message reception notification function is disabled so that the reception is not notified even when an instant message is received. In addition, when the state transitions from the "instant message reception notifying state," the display of a notification is hidden immediately (corresponding to step S31, step S33, Yes in step S35, step S37, and step S39 of FIG. 5 and (d) and (e) in FIG. 6).

Thereafter, in the state of the "instant message reception notification function disabled state", the state is "instant message reception notification function: disabled," and thus there is no transition in the state even when an instant message is received (corresponding to (f) in FIG. 6).

However, in a case in which the user 400 makes the enabling gesture when the state is in the "instant message reception notification function disabled state," the state transitions into the "instant message standby state", and the state becomes "instant message reception notification function: enabled" (corresponding to step S41, step S43, Yes in step S45, and step S47 of FIG. 5 and (g) in FIG. 6).

Thus far, the reception notification given when an instant message is received in the present embodiment has been described with reference to the drawings.

Furthermore, in the present embodiment, presence information can be controlled as well. Here, the presence information is, for example, for notifying a person with whom the user 400 communicates of the state of the user 400 who uses the instant messenger 112. Specifically, when, for example, the user 400 who uses the instant messenger 112 is in a state in which the user 400 can use the information terminal 100, the person with whom the user 400 communicates is notified of the presence information indicating, for example, "at desk." Meanwhile, when the user 400 who uses the instant messenger 112 is not in a state in which the user 400 can use the information terminal 100, the person with whom the user 400 communicates is notified of the presence information indicating, for example, "not at desk." The person with whom the user 400 communicates can determine whether to transmit a message to the user 400 who uses the information terminal 100 by referring to the presence information.

The notification of the presence information is given as the presence information output by the instant messenger 112 is transmitted, via the communication unit 140, to an information terminal used by the person with whom the user 400 communicates.

Now, a reason why presence information is controlled in the present embodiment will be described. In the "Technical Problem" section, the setting of the reception notification function has been described. In this respect, with regard to the presence function of displaying "not at desk" or the like as well, an operation of changing the presence to "not at desk" each time the user leaves his/her desk and changing back to "at desk" upon returning to the desk is troublesome, and it is likely that the user forgets to make a change.

In this respect, as a countermeasure, it is conceivable to implement a function of automatically changing to "not at desk" if no operation is carried out for a prescribed period of time. However, even if such a function is implemented, there remain some problems, including that there is a time lag from when the user has actually left the desk and that the presence is changed to "not at desk" while the user is manually filling in a document without operating the personal computer even though the user has not left the desk. Thus, the presence function may not be used effectively depending on the environment.

Therefore, in the present embodiment, the instant messenger 112 changes the presence information on the basis of the analysis result of the image recognition unit 111. Such a process will be described with reference to the flowchart illustrated in FIG. 7.

Figure 7:
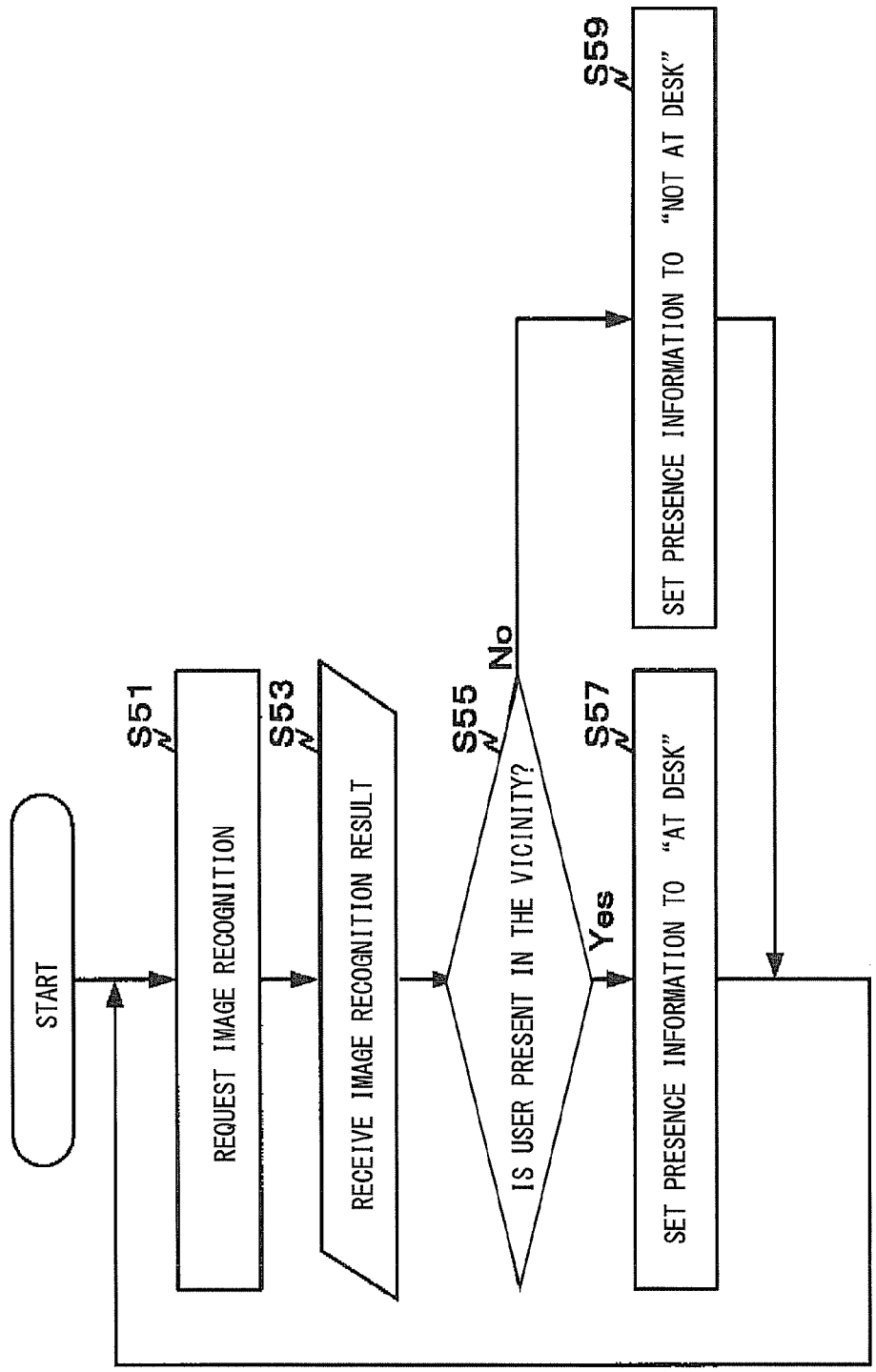
FIG. 7 is a flowchart illustrating an operation pertaining to presence information according to an embodiment of the present invention.

With reference to FIG. 7, first, the instant messenger 112 requests the image recognition unit 111 to analyze the image data through image recognition to determine whether the user 400 is present in the vicinity of the information terminal 100 (step S51). Upon receiving such a request, the image recognition unit 111 carries out an image recognition process on the image data of the vicinity of the information terminal 100 acquired via the image acquisition unit 120 to determine whether the user 400 is present in the vicinity of the information terminal 100.

Next, the instant messenger 112 receives, as the result of the image recognition, information indicating whether the user 400 is present in the vicinity of the information terminal 100 from the image recognition unit 111 (step S53).

Here, if the information received in step S53 is the information indicating that "the user 400 is present in the vicinity of the information terminal 100" (Yes in step S55), the instant messenger 112 sets the presence information to be transmitted to an information terminal used by the person with whom the user 400 who uses the information terminal 100 communicates to "at desk" (step S57). Thus, the person with whom the user 400 who uses the information terminal 100 communicates can find that the user 400 is at his/her desk.

Meanwhile, if the information received in step S53 is the information indicating that "the user 400 is not present in the vicinity of the information terminal 100" (No in step S55), the instant messenger 112 sets the presence information to be transmitted to an information terminal used by the person with whom the user 400 who uses the information terminal 100 communicates to "not at desk" (step S59). Thus, the person with whom the user 400 who uses the information terminal 100 communicates can find that the user 400 is not at his/her desk.

As described thus far, through the process illustrated in FIG. 7, the presence information can be changed automatically without the need for an operation by the user 400. In addition, since the process is carried out not on the basis of whether the personal computer has been operated but on the basis of whether the user 400 is in the vicinity, the problem that the presence is changed to "not at desk" while the user 400 is manually filling in a document without operating the personal computer even though the user 400 has not left the desk can be solved.

The process illustrated in FIG. 7 is carried out by the instant messenger 112 periodically, for example, at a prescribed interval. Therefore, as illustrated in FIG. 7, the process returns to step S51 upon step S57 or step S59 being finished.

An aspect of the present embodiment described thus far can be summarized, for example, into the following content.

In a typical mechanism, the instant message reception notification function operates regardless of the state of the user 400 in accordance with the setting changed on the basis of the operation of the user 400. In addition, with regard to the change in the presence, whether the user 400 is at his/her desk can be detected only through a fixed method that is based on the presence or absence of the keyboard operation or the mouse operation.

In the present embodiment, in the case of the instant message reception notification function, for example, an instant message reception notification is set not to be displayed when an analysis indicates that a person is not present immediately near the camera. In addition, even in a case in which an instant message reception notification is displayed unintentionally, added functions hide the display of the instant message reception notification immediately as the user 400 makes a specific gesture, such as crossing his/her fingers to make a cross sign, toward the camera and disables the instant message reception notification function thereafter. These functions provide an advantageous effect in that the display of the instant message reception notification is hidden when the user 400 is not in front of the information terminal or during a presentation or a conference and, even if the instant message reception notification is displayed, such a display can be hidden immediately.

In addition, the presence function provides the following advantageous effect. Specifically, the presence is set to "not at desk" when a person is not immediately near the camera, and this setting is reflected immediately upon the person leaving his/her desk. The display is not changed to "not at desk" automatically even if the personal computer is not operated for an extended period of time if the person is working on another task at hand. Thus, highly accurate presence information can be shared with a person with whom the user communicates.

In other words, according to the present embodiment, the usability of the instant message reception notification function of the instant messenger improves. In addition, the accuracy of the presence function improves.

In addition, an advantageous effect that the user 400 does not need to carry out a troublesome operation prior to a notification in order to control the notifications and so on is provided.

<Modifications>

Although the embodiments described above are preferred embodiments of the present invention, the scope of the present invention is not limited to the embodiments described above, and the present invention can be implemented through an embodiment to which various modifications are made within the scope that does not depart from the spirit of the present invention. For example, the following modifications can be made.

The present embodiment can be applied not only to such usage as being implemented into a personal computer but also to a mobile communication device, such as a cellular phone, a smartphone, or a tablet. In that case, in place of the means for detecting the presence of a person, the operation of the instant message reception notification function can be changed by detecting the usage status of the device with the use of an acceleration sensor provided in the mobile communication device or a gyro sensor for detecting an inclination. For example, when the sensor detects that the acceleration is at a predetermined acceleration, it can be determined that the user 400 is in the vicinity. In addition, when the inclination detected by the gyro sensor is close to the inclination held when the user 400 usually uses the device, it can be determined that the user 400 is in the vicinity.

In addition, in the embodiments described above, primarily the instant messenger controls the reception notification of an instant message. This may be modified as follows. For example, primarily an email client may control the reception notification of an electronic mail.

Furthermore, the image recognition unit 111 may carry out face recognition to distinguish between the user 400 and other people. Then, the condition that a person is in the vicinity in step S37 or step S55 may be changed to the condition that the user 400 who uses the instant messenger is in the vicinity, and thus a further improvement in the accuracy can be expected. In a similar manner, the condition that the disabling gesture or the enabling gesture has been made in step S35 or step S45 may be changed to the condition that the user 400 who uses the instant messenger has made the disabling gesture or the enabling gesture.

Furthermore, in the embodiments described above, the instant messenger switches the instant message reception notification function or the presence information on the basis of the result of analyzing the image data. In other words, a switching function that is based on the result of analyzing the image data is implemented in the instant messenger.

In place of this, a widely used (general-purpose) instant messenger that is not provided with a switching function that is based on the result of analyzing image data may be used, and software specific to the present embodiment may switch the setting of the notification of an instant message given by the widely used instant messenger or the presence information on the basis of the analysis result.

In addition, in the embodiments described above, in a case in which the user 400 is not in the vicinity when an instant message is received, a pop-up is not displayed, and only the color or the shape of the icon is changed. In this case, if it is detected thereafter that the user 400 is in the vicinity, a pop-up indicating that the aforementioned instant message has been received may be displayed automatically.

In addition, in the embodiments described above, the "vicinity" has been described as, for example, a location where the user 400 can refer to a display screen provided in the information terminal 100 and, for example, is a location that is within several tens of centimeters in front of the display screen provided in the information terminal 100.

In this respect, even if the user 400 is located in the vicinity of the information terminal 100, if that location is a location where the user 400 cannot refer to the display screen provided in the information terminal 100 (e.g., behind the display screen of the information terminal 100), this situation can be treated as that the user 400 is not in the vicinity even through the user 400 is in the vicinity of the information terminal 100. In other words, the determination as to whether the user 400 is in the vicinity can be made not only on the basis of the linear distance from the information terminal 100 to the user 400 but also in consideration of the direction or the like in which the user 400 is located as viewed from the information terminal 100.

The information terminal of the embodiments described above can be implemented by hardware, software, or a combination thereof. In addition, the notification control method performed by the information terminal of the embodiments described above can also be implemented by hardware, software, or a combination thereof. Herein, the expression "being implemented by software" means that a computer loads and executes a program for implementation.

The program can be stored with the use of a variety of types of non-transitory computer readable media (non-transitory computer readable medium) and can be supplied to a computer. The non-transitory computer readable media include a variety of types of tangible storage media (tangible storage medium). Examples of non-transitory computer readable media include a magnetic recording medium (e.g., flexible disk, magnetic tape, hard disk drive), a magneto-optical recording medium (e.g., magneto-optical disk), a CD-ROM (Read Only Memory), a CD-R, a CD-R/W, and a semiconductor memory (e.g., mask ROM, PROM (Programmable ROM), EPROM (Erasable PROM), flash ROM, RAM (Random Access Memory)).

The present application is based on Japanese Patent Application No. 2015-172478 (filed on Sep. 2, 2015) and claims priority to Japanese Patent Application No. 2015-172478 under the Paris Convention. The disclosed content of Japanese Patent Application No. 2015-172478 is incorporated herein by reference to Japanese Patent Application No. 2015-172478.

Although representative embodiments of the present invention have been described in detail, it should be appreciated that various changes, substitutions, and alternatives can be made without departing from the spirit and the scope of the invention defined by the claims. In addition, even if claims are corrected in the application procedures, it is the intention of the inventor that the scope equivalent to the claimed invention is retained.

A part or the entirety of the embodiments described above can also be expressed as in the following supplementary notes but is not limited thereto.

(Supplementary Note 1)

A notification control device comprising:

an image analyzing unit that makes a first determination of determining whether a user is present in a predetermined location by analyzing image data of an image captured by an imaging unit; and a notification control unit that gives a predetermined notification to the user in a case in which it is determined in the first determination that the user is present in the predetermined location and refrains from giving the predetermined notification to the user in a case in which it is determined that the user is not present in the predetermined location.

(Supplementary Note 2)

The notification control device according to Supplementary Note 1, wherein the predetermined notification is a notification given upon information addressed to the user being received, and content of the predetermined notification is content indicating that the information addressed to the user has been received.

(Supplementary Note 3)

The notification control device according to Supplementary Note 1 or 2, wherein the predetermined location is a location where the user can recognize the content of the predetermined notification.

(Supplementary Note 4)

The notification control device according to any one of Supplementary Notes 1 to 3, wherein the image analyzing unit further makes a second determination of determining whether the user has taken a first action by analyzing the image data, and the notification control unit transitions into a state in which the predetermined notification is not given to the user even when the user is present in the predetermined location in a case in which it is determined in the second determination that the user has taken the first action.

(Supplementary Note 5)

The notification control device according to Supplementary Note 4, wherein the image analyzing unit further makes a third determination of determining whether the user has taken a second action by analyzing the image data, and if it is determined in the third determination that the user has taken the second action after the notification control unit has transitioned into the state in which the predetermined notification is not given, the notification control unit returns to a state held prior to the transition, in which the predetermined notification is given to the user in a case in which it is determined in the first determination that the user is present in the predetermined location and the predetermined notification is not given to the user in a case in which it is determined that the user is not present in the predetermined location.

(Supplementary Note 6)

The notification control device according to Supplementary Note 5, wherein the image analyzing unit makes the second determination and the third determination periodically.

(Supplementary Note 7)

The notification control device according to Supplementary Note 5 or 6, wherein the first action and the second action are each an action in which the user makes a predetermined shape by using his/her fingers.

(Supplementary Note 8)

The notification control device according to any one of Supplementary Notes 4 to 7, wherein the notification control unit cancels the predetermined notification if the predetermined notification is being given at a point in time when it is determined in the second determination that the user has taken the first action.

(Supplementary Note 9)

The notification control device according to any one of Supplementary Notes 1 to 8, further comprising:

a presence information notification unit that notifies a device used by a person other than the user of presence information indicating that the user is in a state in which the user can recognize the content of the predetermined notification in a case in which it is determined in the first determination that the user is present in the predetermined location and notifies a device used by a person other than the user of presence information indicating that the user is not in a state in which the user can recognize the content of the predetermined notification in a case in which it is determined that the user is not present in the predetermined location.

(Supplementary Note 10)

The notification control device according to any one of Supplementary Notes 1 to 9, wherein the predetermined notification is a notification indicating that an instant message has been received.

(Supplementary Note 11)

The notification control device according to any one of Supplementary Notes 1 to 10, wherein the image analyzing unit makes a determination by distinguishing between the user and a person other than the user in the determination made by analyzing the image data of the image captured by the imaging unit.

(Supplementary Note 12)

A notification control system, comprising:

the notification control device according to any one of Supplementary Notes 1 to 11; and an instant messenger, wherein the notification control device gives the predetermined notification as a notification pertaining to the instant messenger.

(Supplementary Note 13)

A notification control method comprising:

making a first determination of determining whether a user is present in a predetermined location by analyzing image data of an image captured by an imaging unit; and giving a predetermined notification to the user in a case in which it is determined in the first determination that the user is present in the predetermined location and refraining from giving the predetermined notification to the user in a case in which it is determined that the user is not present in the predetermined location.

(Supplementary Note 14)

A notification control program that causes a computer to function as a notification control device, the notification control device comprising:

an image analyzing unit that makes a first determination of determining whether a user is present in a predetermined location by analyzing image data of an image captured by an imaging unit; and a notification control unit that gives a predetermined notification to the user in a case in which it is determined in the first determination that the user is present in the predetermined location and refrains from giving the predetermined notification to the user in a case in which it is determined that the user is not present in the predetermined location.

INDUSTRIAL APPLICABILITY

The present invention is widely suitable for control pertaining to a reception notification of an instant message, an electronic mail, or the like.

REFERENCE SIGNS LIST 100 information terminal
110 control unit
111 image recognition unit
112 instant messenger
120 image acquisition unit
130 display unit
140 communication unit
200 camera
300 USB cable
400 user

The invention claimed is:

1. A notification control device, comprising:
hardware, including a processor and a memory;
an image analyzing unit that is implemented at least by the hardware and that makes a first determination of determining whether a user is present in a predetermined location by analyzing image data of an image captured by an imaging unit and makes a second determination of determining whether the user has taken a first action by analyzing the image data; and
a notification control unit that is implemented at least by the hardware and that gives a predetermined notification to the user in a case in which it is determined in the first determination that the user is present in the predetermined location, refrains from giving the predetermined notification to the user in a case in which it is determined that the user is not present in the predetermined location, transitions into a state in which the predetermined notification is not given to the user even when the user is present in the predetermined location in a case in which it is determined in the second determination that the user has taken the first action, and cancels the predetermined notification if the predetermined notification is being given at a point in time when it is determined in the second determination that the user has taken the first action.

2. The notification control device according to claim 1, wherein
the predetermined notification is a notification given upon information addressed to the user being received, and
content of the predetermined notification is content indicating that the information addressed to the user has been received.

3. The notification control device according to claim 1, wherein the predetermined location is a location where the user can recognize the content of the predetermined notification.

4. The notification control device according to claim 1, wherein
the image analyzing unit further makes a third determination of determining whether the user has taken a second action by analyzing the image data, and
if it is determined in the third determination that the user has taken the second action after the notification control unit has transitioned into the state in which the predetermined notification is not given,
the notification control unit returns to a state held prior to the transition, in which the predetermined notification is given to the user in a case in which it is determined in the first determination that the user is present in the predetermined location and the predetermined notification is not given to the user in a case in which it is determined that the user is not present in the predetermined location.

5. The notification control device according to claim 4, wherein the image analyzing unit makes the second determination and the third determination periodically.

6. The notification control device according to claim 1, further comprising:
a presence information notification unit that is implemented at least by the hardware and that notifies a device used by a person other than the user of presence information indicating that the user is in a state in which the user can recognize the content of the predetermined notification in a case in which it is determined in the first determination that the user is present in the predetermined location and notifies a device used by a person other than the user of presence information indicating that the user is not in a state in which the user can recognize the content of the predetermined notification in a case in which it is determined that the user is not present in the predetermined location.

7. A notification control method, comprising:
making a first determination of determining whether a user is present in a predetermined location by analyzing image data of an image captured by an imaging unit and making a second determination of determining whether the user has taken a first action by analyzing the image data; and
giving a predetermined notification to the user in a case in which it is determined in the first determination that the user is present in the predetermined location, refraining from giving the predetermined notification to the user in a case in which it is determined that the user is not present in the predetermined location, transitioning into a state in which the predetermined notification is not given to the user even when the user is present in the predetermined location in a case in which it is determined in the second determination that the user has taken the first action, and canceling the predetermined notification if the predetermined notification is being given at a point in time when it is determined in the second determination that the user has taken the first action.

8. A non-transitory computer readable medium storing a notification control program that causes a computer to function as a notification control device, the notification control device comprising:
an image analyzing unit that makes a first determination of determining whether a user is present in a predetermined location by analyzing image data of an image captured by an imaging unit and makes a second determination of determining whether the user has taken a first action by analyzing the image data; and
a notification control unit that gives a predetermined notification to the user in a case in which it is determined in the first determination that the user is present in the predetermined location, refrains from giving the predetermined notification to the user in a case in which it is determined that the user is not present in the predetermined location, transitions into a state in which the predetermined notification is not given to the user even when the user is present in the predetermined location in a case in which it is determined in the second determination that the user has taken the first action, and cancels the predetermined notification if the predetermined notification is being given at a point in time when it is determined in the second determination that the user has taken the first action.

* * * * *

UNITED STATES PATENT AND TRADEMARK OFFICE
CERTIFICATE OF CORRECTION

PATENT NO. : 9,979,688 B2  
APPLICATION NO. : 15/566864  
DATED : May 22, 2018  
INVENTOR(S) : Tomohiro Ohno Page 1 of 1

It is certified that error appears in the above-identified patent and that said Letters Patent is hereby corrected as shown below:

On the Title Page

Column 1, (*) Notice; Line 3; "days. days." has been replaced with --days.-- therefor In the Specification Column 5, Description of Embodiments, Lines 4-5; After "the information terminal", delete "information terminal"

Signed and Sealed this  
Twenty-ninth Day of January, 2019

Andrei Iancu  
*Director of the United States Patent and Trademark Office*